(12) United States Patent
Schwarz et al.

(10) Patent No.: US 12,096,027 B2
(45) Date of Patent: Sep. 17, 2024

(54) METHOD, AN APPARATUS AND A COMPUTER PROGRAM PRODUCT FOR VOLUMETRIC VIDEO ENCODING AND DECODING

(71) Applicant: Nokia Technologies Oy, Espoo (FI)

(72) Inventors: Sebastian Schwarz, Unterhaching (DE); Kimmo Roimela, Tampere (FI); Mika Pesonen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 234 days.

(21) Appl. No.: 17/611,243

(22) PCT Filed: Apr. 15, 2020

(86) PCT No.: PCT/FI2020/050243
§ 371 (c)(1),
(2) Date: Nov. 15, 2021

(87) PCT Pub. No.: WO2020/234509
PCT Pub. Date: Nov. 26, 2020

(65) Prior Publication Data
US 2022/0217400 A1    Jul. 7, 2022

(30) Foreign Application Priority Data

May 22, 2019    (FI) ..................................... 20195425

(51) Int. Cl.
*H04N 19/597*    (2014.01)
*G06T 15/06*    (2011.01)
*H04N 19/70*    (2014.01)

(52) U.S. Cl.
CPC ........... *H04N 19/597* (2014.11); *G06T 15/06* (2013.01); *H04N 19/70* (2014.11); *G06T 2210/56* (2013.01)

(58) Field of Classification Search
None
See application file for complete search history.

(56) References Cited

U.S. PATENT DOCUMENTS 8,866,813 B2    10/2014 Armsden et al.
11,210,860 B2 *    12/2021 Noris .................. G06T 7/50
(Continued)

FOREIGN PATENT DOCUMENTS

WO    2019/198523 A1    10/2019

OTHER PUBLICATIONS

Office action received for corresponding Indian Patent Application No. 202147059484, dated Jun. 2, 2022, 6 pages.
(Continued)

*Primary Examiner* — Talha M Nawaz
(74) *Attorney, Agent, or Firm* — Joseph C. Drish; Harrington & Smith

(57) ABSTRACT

A method for decoding comprises receiving a compressed bitstream relating to a video presentation; decoding from the received bitstream data relating to three-dimensional blocks of a video frame; for each block of the video frame, determining information on surface parameters; generating a bounding box for a three-dimensional block according to the surface parameters; calculating a ray direction for each pixel of the three-dimensional block from a viewpoint to coordinates of the pixel; determining at least two points according to an intersection of the ray to the generated bounding box; ray casting points between the determined at least two points until a condition to finish the ray casting is met; reconstructing three-dimensional data from the geometry image and the texture image according to the information on one or more surface parameters for a block; reconstructing a video presentation according to the reconstructed three-dimensional data for rendering.

22 Claims, 10 Drawing Sheets

(56) References Cited

U.S. PATENT DOCUMENTS

| | | |
|---|---|---|
| 2010/0085357 A1 | 4/2010 | Sullivan et al. |
| 2012/0154399 A1 | 6/2012 | Munkberg et al. |
| 2017/0178387 A1 | 6/2017 | Woop et al. |
| 2019/0087979 A1 | 3/2019 | Mammou et al. |
| 2020/0211152 A1* | 7/2020 | Benthin .................. G06N 3/045 |
| 2020/0211231 A1* | 7/2020 | Brownlee ................. G06T 9/00 |
| 2020/0211253 A1* | 7/2020 | Liktor ..................... G06T 1/60 |
| 2020/0211261 A1* | 7/2020 | Janus .................. G06T 17/005 |
| 2021/0097641 A1* | 4/2021 | Iyer ...................... A63F 13/355 |
| 2021/0233313 A1* | 7/2021 | Noris ................... G06T 19/006 |

OTHER PUBLICATIONS

"V-PCC Codec Description", 3DG, ISO/IEC JTC1/SC29/WG11 MPEG2019/N19526, Sep. 28, 2020, 73 pages.

Extended European Search Report received for corresponding European Patent Application No. 20809109.0, dated Apr. 5, 2023, 11 pages.

Hamza, "Questions Related to V-PCC File Format Design", Systems, ISO/IEC JTC 1/SC 29/WG 11 N18415, Apr. 2019, 6 pages.

Office action received for corresponding Japanese Patent Application No. 2021-569317, dated Dec. 5, 2022, 3 pages of office action and no page of translation available.

"Information technology—Coded Representation of Immersive Media—Part 5: Video-based Point Cloud Compression", ISO/IEC JTC 1/SC 29/WG 11, ISO/IEC 23090-5, 2019, 102 pages.

Linsen et al., "Splat-based Ray Tracing of Point Clouds", Journal of WSCG, 2007, 8 pages.

Hubo et al., "The Quantized KD-tree: Efficient Ray Tracing of Compressed Point Clouds", IEEE Symposium on Interactive Ray Tracing, Sep. 18-20, 2006, 8 pages.

Wald et al., "Interactive Ray Tracing of Point-based Models", Eurographics Symposium on Point-Based Graphics, 2005, pp. 1-8.

Office action received for corresponding Finnish Patent Application No. 20195425, dated Dec. 20, 2019, 10 pages.

Zakharchenko, "V-PCC Codec description", 3DG, ISO/IEC JTC1/SC29/WG11 MPEG2019/N18190, Jan. 2019, 38 pages.

Tevs et al., "Maximum Mipmaps for Fast, Accurate, and Scalable Dynamic Height Field Rendering", Proceedings of the 2008 symposium on Interactive 3D graphics and games, Feb. 2008, pp. 183-190.

Oh et al., "Pyramidal Displacement Mapping: A GPU based Artifacts-Free Ray Tracing through an Image Pyramid", Proceedings of the ACM symposium on Virtual reality software and technology, Nov. 2006, pp. 75-82.

Schwarz et al., "Nokia's response to CfP for Point Cloud Compression (Category 2)", Nokia Technologies, ISO/IEC JTC1/SC29/WG11 MPEG2017/M41779, Oct. 2017, 22 pages.

International Search Report and Written Opinion received for corresponding Patent Cooperation Treaty Application No. PCT/FI2020/050243, dated Jul. 17, 2020, 14 pages.

* cited by examiner

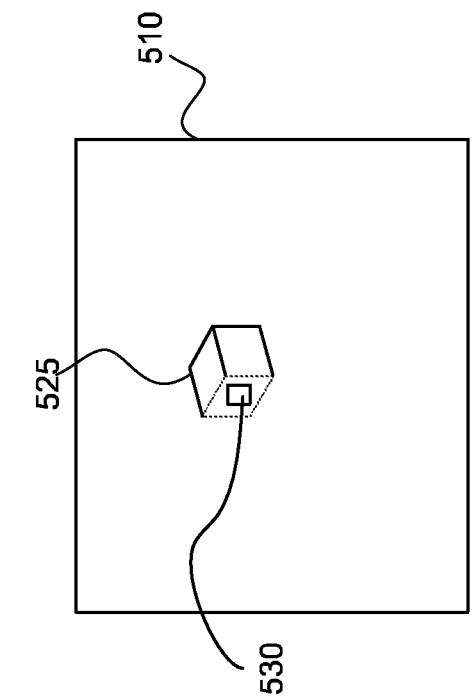
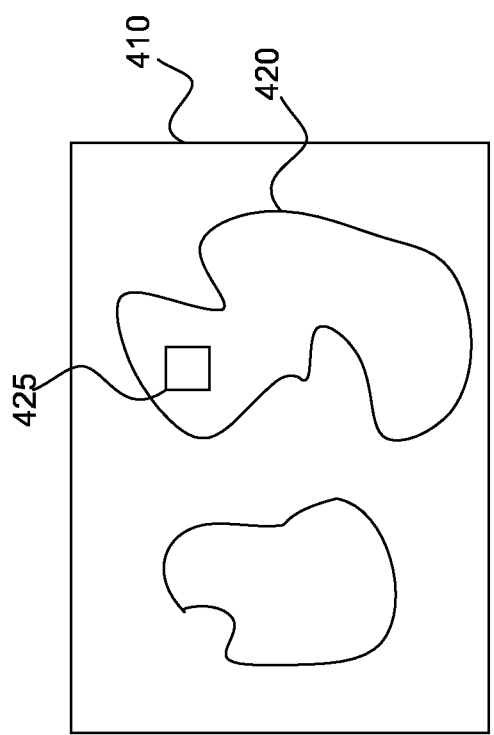

METHOD, AN APPARATUS AND A COMPUTER PROGRAM PRODUCT FOR VOLUMETRIC VIDEO ENCODING AND DECODING

RELATED APPLICATION

This application was originally filed as PCT Application No. PCT/FI2020/050243, filed on Apr. 15, 2020, which claims priority from Finland Application No. 20195425, filed on May 22, 2019, each of which is incorporated herein by reference in its entirety.

TECHNICAL FIELD

The present solution generally relates to volumetric video coding. In particular, the solution relates to point cloud compression.

BACKGROUND

Since the beginning of photography and cinematography, the most common type of image and video content has been captured by cameras with relatively narrow field of view, and displayed as a rectangular scene on flat displays. The cameras are mainly directional, whereby they capture only a limited angular field of view (the field of view towards which they are directed).

More recently, new image and video capture devices are available. These devices are able to capture visual and audio content all around them, i.e. they can capture the whole angular field of view, sometimes referred to as 360 degrees field of view. More precisely, they can capture a spherical field of view (i.e., 360 degrees in all spatial directions). Furthermore, new types of output technologies have been invented and produced, such as head-mounted displays. These devices allow a person to see visual content all around him/her, giving a feeling of being "immersed" into the scene captured by the 360 degrees camera. The new capture and display paradigm, where the field of view is spherical, is commonly referred to as virtual reality (VR) and is believed to be the common way people will experience media content in the future.

For volumetric video, a scene may be captured using one or more 3D (three-dimensional) cameras. The cameras are in different positions and orientations within a scene. One issue to consider is that compared to 2D (two-dimensional) video content, volumetric 3D video content has much more data, so viewing it requires lots of bandwidth (with or without transferring it from a storage location to a viewing device): disk I/O, network traffic, memory bandwidth, GPU (Graphics Processing Unit) upload. Capturing volumetric content also produces a lot of data, particularly when there are multiple capture devices used in parallel.

SUMMARY

Now there has been invented an improved method and technical equipment implementing the method, for providing an improvement for volumetric video coding. Various aspects include a method, an apparatus, and a computer readable medium comprising a computer program stored therein, which are characterized by what is stated in the independent claims. Various embodiments are disclosed in the dependent claims.

According to a first aspect, there is provided a method for encoding, comprising receiving a video presentation frame, where the video presentation represents a three-dimensional data; generating one or more patches from the video presentation frame; dividing a patch of a video frame into one or more blocks; determining a surface parameter for each patch according to information relating to said one or more blocks of a patch; encoding the determined surface parameters to a bitstream; and storing the encoded bitstream for transmission to a rendering apparatus.

According to a second aspect, there is provided a method for decoding, comprising receiving a compressed bitstream relating to a video presentation, the bitstream comprising at least a geometry image and a texture image; decoding from the received bitstream data relating to one or more three-dimensional blocks of a video frame; for each block of the video frame, determining information on one or more surface parameters; generating a bounding box for a three-dimensional block according to the one or more surface parameters; calculating a ray direction for each pixel of the three-dimensional block from a viewpoint to coordinates of the pixel; determining at least two points according to an intersection of the ray to the generated bounding box; ray casting points between the determined at least two points until a condition to finish the ray casting is met; reconstructing three-dimensional data from the geometry image and the texture image according to the information on one or more surface parameters for a block; reconstructing a video presentation according to the reconstructed three-dimensional data for rendering.

According to a third aspect, there is provided an apparatus for encoding a bitstream, comprising means for receiving a video presentation frame, where the video presentation represents a three-dimensional data; means for generating one or more patches from the video presentation frame; means for dividing a patch of a video frame into one or more blocks; means for determining a surface parameter for each patch according to information relating to said one or more blocks of a patch; means for encoding the determined surface parameters to a bitstream; and means for storing the encoded bitstream for transmission to a rendering apparatus.

According to a fourth aspect, there is provided an apparatus for decoding a bitstream, comprising means for receiving a compressed bitstream relating to a video presentation, the bitstream comprising at least a geometry image and a texture image; means for decoding from the received bitstream data relating to one or more three-dimensional blocks of a video frame; for each block of the video frame, means for determining information on one or more surface parameters; means for generating a bounding box for a three-dimensional block according to the one or more surface parameters; means for calculating a ray direction for each pixel of the three-dimensional block from a viewpoint to coordinates of the pixel; means for determining at least two points according to an intersection of the ray to the generated bounding box; means for ray casting points between the determined at least two points until a condition to finish the ray casting is met; means for reconstructing three-dimensional data from the geometry image and the texture image according to the information on one or more surface parameters for a block; and means for reconstructing a video presentation according to the reconstructed three-dimensional data for rendering.

According to a fifth aspect, there is provided an apparatus comprising at least one processor, and memory including computer program code, the memory and the computer program code configured to, with the at least one processor, cause the apparatus to perform at least the following: to receive a video presentation frame, where the video presentation represents a three-dimensional data; to generate one or more patches from the video presentation frame; to divide a patch of a video frame into one or more blocks; to determine a surface parameter for each patch according to information relating to said one or more blocks of a patch; to encode the determined surface parameters to a bitstream; and to store the encoded bitstream for transmission to a rendering apparatus.

According to a sixth aspect, there is provided an apparatus comprising at least one processor, and memory including computer program code, the memory and the computer program code configured to, with the at least one processor, cause the apparatus to perform at least the following: to receive a compressed bitstream relating to a video presentation, the bitstream comprising at least a geometry image and a texture image; to decode from the received bitstream data relating to one or more three-dimensional blocks of a video frame; for each block of the video frame, to determine information on one or more surface parameters; to generate a bounding box for a three-dimensional block according to the one or more surface parameters; to calculate a ray direction for each pixel of the three-dimensional block from a viewpoint to coordinates of the pixel; to determine at least two points according to an intersection of the ray to the generated bounding box; to ray cast points between the determined at least two points until a condition to finish the ray casting is met; to reconstruct three-dimensional data from the geometry image and the texture image according to the information on one or more surface parameters for a block; to reconstruct a video presentation according to the reconstructed three-dimensional data for rendering.

According to a seventh aspect, there is provided a computer program product comprising computer program code configured to, when executed on at least one processor, cause an apparatus or a system to receive a video presentation frame, where the video presentation represents a three-dimensional data; to generate one or more patches from the video presentation frame; to divide a patch of a video frame into one or more blocks; to determine a surface parameter for each patch according to information relating to said one or more blocks of a patch; to encode the determined surface parameters to a bitstream; and to store the encoded bitstream for transmission to a rendering apparatus.

According to an eighth aspect, there is provided a computer program product comprising computer program code configured to, when executed on at least one processor, cause an apparatus or a system to receive a compressed bitstream relating to a video presentation, the bitstream comprising at least a geometry image and a texture image; to decode from the received bitstream data relating to one or more three-dimensional blocks of a video frame; for each block of the video frame, to determine information on one or more surface parameters; to generate a bounding box for a three-dimensional block according to the one or more surface parameters; to calculate a ray direction for each pixel of the three-dimensional block from a viewpoint to coordinates of the pixel; to determine at least two points according to an intersection of the ray to the generated bounding box; to ray cast points between the determined at least two points until a condition to finish the ray casting is met; to reconstruct three-dimensional data from the geometry image and the texture image according to the information on one or more surface parameters for a block; to reconstruct a video presentation according to the reconstructed three-dimensional data for rendering.

According to an embodiment, the information on one or more surface parameters is decoded from a bitstream.

According to an embodiment, the information on one or more surface parameters is determined from pixels of various depth layers.

According to an embodiment, the condition to finish the ray casting is determined by determining depth values for both depth layers on location of a pixel, by calculating a depth value from the viewing ray, and by comparing the depth value from the viewing ray to the determined depth values.

According to an embodiment, the condition to finish the ray casting is determined from another bounding box that is formed from depth difference values and pixel coordinates.

According to an embodiment, the surface parameter is a depth or a depth difference of a patch.

According to an embodiment, the surface parameter is a rendering thickness parameter determined from a depth difference.

According to an embodiment, at least two points are determined based on the ray direction and ray casting every pixel between said two points in two-dimensional coordinates.

According to an embodiment, depth values for first and second depth layers are obtained for each two-dimensional pixels between said two points.

According to an embodiment, it is determined whether there is an intersection between point cloud content and the ray According to an embodiment, the rendering thickness parameter is encoded into or decoded from a supplemental enhancement information (SEI) message.

According to an embodiment, the rendering parameter is encoded/decoded for each block.

According to an embodiment, the rendering parameter is encoded into or decoded from an occupancy map.

According to an embodiment, a color interpolation between depth layers is encoded into or decoded from the bitstream.

According to an embodiment, the computer program product is embodied on a non-transitory computer readable medium.

DESCRIPTION OF THE DRAWINGS

In the following, various embodiments will be described in more detail with reference to the appended drawings, in which
FIG. 4 shows an example of a patch in a frame;
FIG. 5 shows an example of a block in 3D.

DESCRIPTION OF EXAMPLE EMBODIMENTS

Figure 1:
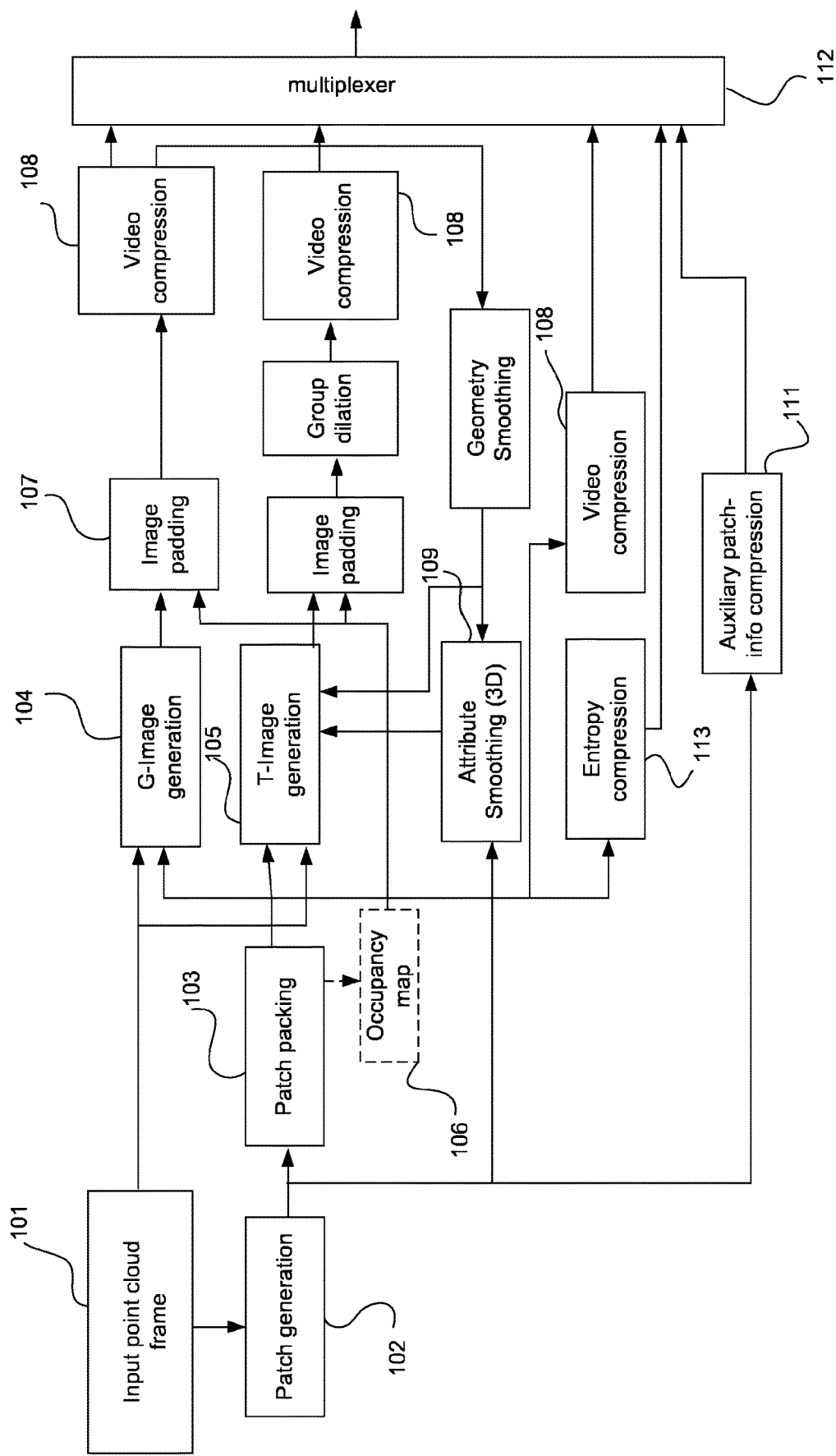
FIG. 1 shows an example of a compression process.

In the following, several embodiments will be described in the context of digital volumetric video. In particular, the several embodiments enable encoding and decoding of digital volumetric video material. The present embodiments are applicable e.g. in the MPEG Video-Based Point Cloud Coding (V-PCC).

Volumetric video may be captured using one or more three-dimensional (3D) cameras. When multiple cameras are in use, the captured footage is synchronized so that the cameras provide different viewpoints to the same world. In contrast to traditional two-dimensional/tree-dimensional (2D/3D) video, volumetric video describes a 3D model of the world where the viewer is free to move and observe different parts of the world.

Volumetric video enables the viewer to move in six degrees of freedom (DOF): in contrast to common 360° video, where the user has from 2 to 3 degrees of freedom (yaw, pitch, and possibly roll), a volumetric video represents a 3D volume of shape rather than a flat image plane. Volumetric video frames contain a large amount of data because they model the contents of a 3D volume instead of just a 2D plane. However, only a relatively small part of the volume changes over time. Therefore, it may be possible to reduce the total amount of data by only coding information about an initial state and changes which may occur between frames. Volumetric video can be rendered from synthetic 3D animations, reconstructed from multi-view video using 3D reconstructing techniques such as structure from motion, or captured with a combination of cameras and depth sensors such as LiDAR, for example.

Volumetric video data represents a three-dimensional scene or object, and can be used as input for augmented reality (AR), virtual reality (VR) and mixed reality (MR) applications. Such data describes geometry (shape, size, position in 3D space) and respective attributes (e.g. color, opacity, reflectance, . . . ). In addition, the volumetric video data can define any possible temporal changes of the geometry and attributes at given time instances (such as frames in 2D video). Volumetric video can be generated from 3D models, i.e. computer-generated imaginary (CGI), or captured from real-world scenes using a variety of capture solutions, e.g. multi-camera, laser scan, combination of video and dedicated depth sensors, and more. Also, a combination of CGI and real-world data is possible. Examples of representation formats for such volumetric data comprises triangle meshes, point clouds, or voxel. Temporal information about the scene can be included in the form of individual capture instances, i.e. "frames" in 2D video, or other means, e.g. position of an object as a function of time.

Because volumetric video describes a 3D scene (or object), such data can be viewed from any viewpoint. Therefore, volumetric video is an important format for any AR, VR, or MR applications, especially for providing 6DOF viewing capabilities.

Increasing computational resources and advances in 3D data acquisition devices has enabled reconstruction of highly detailed volumetric video representations of natural scenes. Infrared, lasers, time-of-flight and structured light are examples of devices that can be used to construct 3D video data. Representation of the 3D data depends on how the 3D data is used. Dense Voxel arrays have been used to represent volumetric medical data. In 3D graphics, polygonal meshes are extensively used. Point clouds on the other hand are well suited for applications such as capturing real world 3D scenes where the topology is not necessarily a 2D manifold. Another way to represent 3D data is to code the 3D data as a set of texture and depth map as is the case in the multi-view plus depth. Closely related to the techniques used in multi-view plus depth is the use of elevation maps, and multi-level surface maps.

In 3D point clouds, each point of each 3D surface is described as a 3D point with color and/or other attribute information such as surface normal or material reflectance. Point cloud is a set of data points (i.e. locations) in a coordinate system, for example in a three-dimensional coordinate system being defined by X, Y, and Z coordinates. The points may represent an external surface of an object in the screen space, e.g. in a 3D space. A point may be associated with a vector of attributes. A point cloud can be used to reconstruct an object or a scene as a composition of the points. Point clouds can be captured by using multiple cameras and depth sensors. A dynamic point cloud is a sequence of static point clouds, wherein each static point cloud is in its own "point cloud frame".

In dense point clouds or voxel arrays, the reconstructed 3D scene may contain tens or even hundreds of millions of points. If such representation are to be stored or interchanged between entities, then efficient compression is needed. Volumetric video representation formats, such as point clouds, meshes, voxel, does not have a sufficient temporal compression performance. Identifying correspondences for motion-compensation in 3D-space is an ill-defined problem, as both geometry and respective attributes may change. For example, temporal successive point cloud frames do not necessarily have the same number of meshes, points or voxel. Therefore, compression of dynamic 3D scenes is inefficient. Approaches for compressing volumetric data that are based on 2D video, i.e. multiview and depth, have better compression efficiency, but rarely cover the full scene. Therefore, they provide only limited 6DOF capabilities.

Instead of the above-mentioned approach, a 3D scene, represented as meshes, points, and/or voxel, can be projected onto one or more geometries. These geometries can be "unfolded" onto 2D planes (two planes per geometry: one for texture, one for depth), which may then be encoded using standard 2D video compression technologies. Relevant projection geometry information may be transmitted alongside the encoded video files to the decoder. The decoder may decode the video and perform the inverse projection to regenerate the 3D scene in any desired representation format (not necessarily the starting format).

Projecting volumetric models onto 2D planes allows for using standard 2D video coding tools with highly efficient temporal compression. Thus, coding efficiency is increased greatly. Using geometry-projections instead of known 2D-video based approaches, i.e. multiview and depth, provide a better coverage of the scene (or object). Thus, 6DOF capabilities are improved. Using several geometries for individual objects improves the coverage of the scene further. Furthermore, standard video encoding hardware can be utilized for real-time compression/decompression of the projected planes. The projection and reverse projection steps are of low complexity.

An overview of a compression process is shortly discussed next. Such process may be applied for example in V-PCC. At the encoding stage, the input point cloud frame is processed in a following manner: First the volumetric 3D data may be represented as a set of 3D projections in different components. At the separation stage, image is decomposed into far and near components for geometry and corresponding attributes components, in addition an occupancy map 2D image may be created to indicate parts of an image that shall be used. The 2D projection is composed of independent patches based on geometry characteristics of the input point cloud frame. After the patches have been generated and 2D frames for video encoding have been created, the occupancy map, geometry information and the auxiliary information may be compressed. At the end of the process, the separate bitstreams are multiplexed into the output compressed binary file.

FIG. 1 shows the encoding process in more detailed manner.

The process starts with an input frame representing a point cloud frame 101 that is provided for patch generation 102, geometry image generation 104 and texture image generation 105. Each point cloud frame 101 represents a dataset of points within a 3D volumetric space that has unique coordinates and attributes.

The patch generation 102 process decomposes the point cloud frame 101 by converting 3D samples to 2D samples on a given projection plane using a strategy which provides the best compression. According to an example, patch generation 102 process aims at decomposing the point cloud frame 101 into a minimum number of patches with smooth boundaries, while also minimizing the reconstruction error.

At the initial stage of the patch generation 102, a normal per each point is estimated. The tangent plane and its corresponding normal are defined per each point, based on the point's nearest neighbors m within a predefined search distance. A k-dimensional tree may be used to separate the data and find neighbors in a vicinity of a point $p_i$ and a barycenter $c=\bar{p}$ of that set of points is used to define the normal. The barycenter c may be computed as follows:

$$c = \bar{p} = \frac{1}{m}\sum_{i=1}^{m} p_i$$

The normal is estimated from eigen decomposition for the defined point cloud as:

$$\sum_{i=1}^{m} (p_i - \bar{p})(p_i - \bar{p})^T$$

Based on this information, each point is associated with a corresponding plane of a point cloud bounding box. Each plane is defined by a corresponding normal $\vec{n}_{p_{idx}}$ with values:
(1.0, 0.0, 0.0),
(0.0, 1.0, 0.0),
(0.0, 0.0, 1.0),
(−1.0, 0.0, 0.0),
(0.0, −1.0, 0.0),
(0.0, 0.0, −1.0)

More precisely, each point may be associated with the plane that has the closest normal (i.e. maximizes the dot product of the point normal $\vec{n}_{p_i}$ and the plane normal $\vec{n}_{p_{idx}}$).

$$\max_{p_{idx}}\{\vec{n}_{p_i} \cdot \vec{n}_{p_{idx}}\}$$

The sign of the normal is defined depending on the point's position in relationship to the "center".

The initial clustering may then be refined by iteratively updating the cluster index associated with each point based on its normal and the cluster indices of its nearest neighbors.

The final step of the patch generation 102 may comprise extracting patches by applying a connected component extraction procedure.

Patch info determined at patch generation 102 for the input point cloud frame 101 is delivered to patch packing 103, to geometry image generation 104, to texture image generation 105, to attribute smoothing (3D) 109 and to auxiliary patch info compression 113. The patch packing 103 aims at generating the geometry and texture maps, by appropriately considering the generated patches and by trying to efficiently place the geometry and texture data that correspond to each patch onto a 2D grid of size W×H. Such placement also accounts for a user-defined minimum size block T×T (e.g. 16×16), which specifies the minimum distance between distinct patches as placed on this 2D grid. Parameter T may be encoded in the bitstream and sent to the decoder.

The packing process 103 may iteratively try to insert patches into a W×H grid. W and H are user defined parameters, which correspond to the resolution of the geometry/texture images that will be encoded. The patch location may be determined through an exhaustive search that may be performed in raster scan order. Initially, patches are placed on a 2D grid in a manner that would guarantee non-overlapping insertion. Samples belonging to a patch (rounded to a value that is a multiple of T) are considered as occupied blocks. In addition, a safeguard between adjacent patches is forced to distance of at least one block being multiple of T. Patches are processed in an orderly manner, based on the patch index list. Each patch from the list is iteratively placed on the grid. The grid resolution depends on the original point cloud size and its width (W) and height (H) are transmitted to the decoder. In the case that there is no empty space available for the next patch the height value of the grid is initially doubled, and the insertion of this patch is evaluated again. If insertion of all patches is successful, then the height is trimmed to the minimum needed value. However, this value is not allowed to be set lower than the originally specified value in the encoder. The final values for W and H correspond to the frame resolution that is used to encode the texture and geometry video signals using the appropriate video codec.

Figure 2:
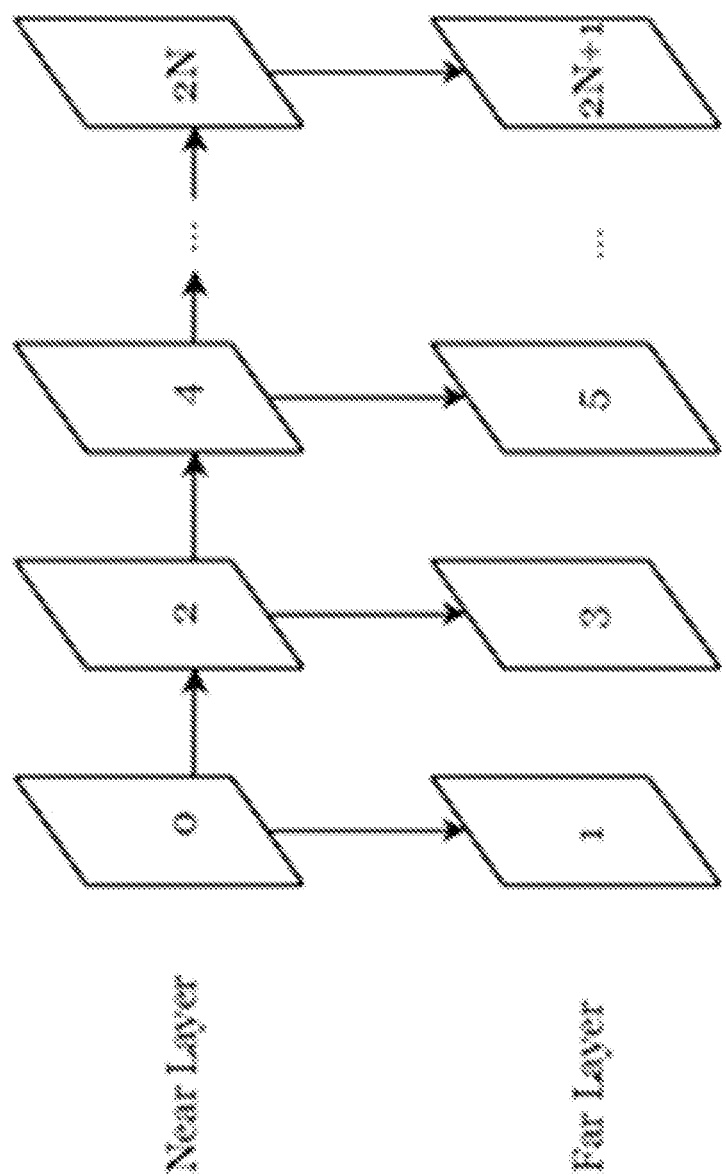
FIG. 2 shows an example of a layer projection structure.

The geometry image generation 104 and the texture image generation 105 are configured to generate geometry images and texture images. The image generation process may exploit the 3D to 2D mapping computed during the packing process to store the geometry and texture of the point cloud as images. In order to better handle the case of multiple points being projected to the same pixel, each patch may be projected onto two images, referred to as layers. For example, let H(u, y) be the set of points of the current patch that get projected to the same pixel (u, v). FIG. 2 illustrates an example of layer projection structure. The first layer, also called a near layer, stores the point of H(u, v) with the lowest depth D0. The second layers, referred to as the far layer, captures the point of H(u, v) with the highest depth within the interval [D0, D0+Δ], where Δ is a user-defined parameter that describes the surface thickness. The generated videos may have the following characteristics:
Geometry: W×H YUV420-8 bit,
Texture: W×H YUV420-8 bit, It is to be noticed that the geometry video is monochromatic. In addition, the texture generation procedure exploits the reconstructed/smoothed geometry in order to compute the colors to be associated with the re-sampled points.

The surface separation method is applied to prevent the mixing of different surfaces in the connected components when there is a stack of multiple different surfaces in that connected component. One of the methods to separate surfaces is to use differences of MSE values of points in RGB color domain:

Patch is separated if $$MSE(R_1-R_2, G_1-G_2, B_1-B_2) > \text{Threshold};$$

Threshold=20 where $R_1$, $G_1$, $B_1$ are attribute values belonging to T0 and $R_2$, $G_2$, $B_2$ are the attribute values belonging to T1.

The geometry images and the texture images may be provided to image padding 107. The image padding 107 may also receive as an input an occupancy map (OM) 106 to be used with the geometry images and texture images. The occupancy map 106 may comprise a binary map that indicates for each cell of the grid whether it belongs to the empty space or to the point cloud. In other words, the occupancy map (OM) may be a binary image of binary values where the occupied pixels and non-occupied pixels are distinguished and depicted respectively. The occupancy map may alternatively comprise a non-binary image allowing additional information to be stored in it. Therefore, the representative values of the DOM may comprise binary values or other values, for example integer values. It should be noticed that one cell of the 2D grid may produce a pixel during the image generation process.

The padding process 107 aims at filling the empty space between patches in order to generate a piecewise smooth image suited for video compression. For example, in a simple padding strategy, each block of T×T (e.g. 16×16) pixels is compressed independently. If the block is empty (i.e. unoccupied, i.e. all its pixels belong to empty space), then the pixels of the block are filled by copying either the last row or column of the previous T×T block in raster order. If the block is full (i.e. occupied, i.e., no empty pixels), nothing is done. If the block has both empty and filled pixels (i.e. edge block), then the empty pixels are iteratively filled with the average value of their non-empty neighbors.

The padded geometry images and padded texture images may be provided for video compression 108. The generated images/layers may be stored as video frames and compressed using for example High Efficiency Video Coding (HEVC) Test Model 16 (HM) video codec according to the HM configurations provided as parameters. The video compression 108 also generates reconstructed geometry images to be provided for smoothing 109, wherein a smoothed geometry is determined based on the reconstructed geometry images and patch info from the patch generation 102. The smoothed geometry may be provided to texture image generation 105 to adapt the texture images.

The patch may be associated with auxiliary information being encoded/decoded for each patch as metadata. The auxiliary information may comprise index of the projection plane, 2D bounding box, 3D location of the patch represented in terms of depth δ0, tangential shift s0 and bitangential shift r0.

The following metadata may be encoded/decoded for every patch:
  Index of the projection plane
    Index 0 for the planes (1.0, 0.0, 0.0) and (−1.0, 0.0, 0.0)
    Index 1 for the planes (0.0, 1.0, 0.0) and (0.0, −1.0, 0.0)
    Index 2 for the planes (0.0, 0.0, 1.0) and (0.0, 0.0, −1.0).
  2D bounding box (u0, v0, u1, v1)
  3D location (x0, y0, z0) of the patch represented in terms of depth δ0, tangential shift s0 and bi-tangential shift r0. According to the chosen projection planes, (δ0, s0, r0) are computed as follows:
    Index 0, δ0=x0, s0=z0 and r0=y0
    Index 1, δ0=y0, s0=z0 and r0=x0
    Index 2, δ0=z0, s0=x0 and r0=y0

Also, mapping information providing for each T×T block its associated patch index may be encoded as follows:
  For each T×T block, let L be the ordered list of the indexes of the patches such that their 2D bounding box contains that block. The order in the list is the same as the order used to encode the 2D bounding boxes. L is called the list of candidate patches.
  The empty space between patches is considered as a patch and is assigned the special index 0, which is added to the candidate patches list of all the blocks.
  Let I be index of the patch to which belongs the current T×T block and let J be the position of I in L. Instead of explicitly encoding the index I, its position J is arithmetically encoded instead, which leads to better compression efficiency.

The compression process may comprise one or more of the following example operations:
  Binary values may be associated with B0×B0 sub-blocks belonging to the same T×T block. A value 1 associated with a sub-block, if it contains at least a non-padded pixel, and 0 otherwise. If a sub-block has a value of 1 it is said to be full, otherwise it is an empty sub-block.
  If all the sub-blocks of a T×T block are full (i.e., have value 1). The block is said to be full. Otherwise, the block is said to be non-full.
  A binary information may be encoded for each T×T block to indicate whether it is full or not.
  If the block is non-full, an extra information indicating the location of the full/empty sub-blocks may be encoded as follows:
    Different traversal orders may be defined for the sub-blocks, for example horizontally, vertically, or diagonally starting from top right or top left corner
    The encoder chooses one of the traversal orders and may explicitly signal its index in the bitstream.
    The binary values associated with the sub-blocks may be encoded by using a run-length encoding strategy.
    The binary value of the initial sub-block is encoded.
    Continuous runs of 0s and 1s are detected, while following the traversal order selected by the encoder.
    The number of detected runs is encoded.
    The length of each run, except of the last one, is also encoded.

In occupancy map coding (lossy condition) a two-dimensional binary image of resolution (Width/B0)×(Height/B1), where Width and Height are the width and height of the geometry and texture images that are intended to be compressed. A sample equal to 1 means that the corresponding/co-located sample or samples in the geometry and texture image should be considered as point cloud points when decoding, while a sample equal to 0 should be ignored (commonly includes padding information). The resolution of the occupancy map does not have to be the same as those of the geometry and texture images and instead the occupancy map could be encoded with a precision of B0×B1 blocks. In order to achieve lossless encoding B0 and B1 are selected to be equal to 1. In practice, B0=B1=2 or B0=B1=4 can result in visually acceptable results, while significantly reducing the number of bits required to encode the occupancy map. The generated binary image covers only a single colour plane. However, given the prevalence of 4:2:0 codecs, it may be desirable to extend the image with "neutral" or fixed value chroma planes (e.g. add chroma planes with all sample values equal to 0 or 128, assuming the use of an 8-bit codec).

The obtained video frame may be compressed by using a video codec with lossless coding tool support (e.g., AVC, HEVC RExt, HEVC-SCC).

Occupancy map may be simplified by detecting empty and non-empty blocks of resolution T×T in the occupancy map and only for the non-empty blocks we encode their patch index as follows:

A list of candidate patches is created for each T×T block by considering all the patches that contain that block.
The list of candidates is sorted in the reverse order of the patches.
For each block,
1. If the list of candidates has one index, then nothing is encoded.
2. Otherwise, the index of the patch in this list is arithmetically encoded.

The point cloud geometry reconstruction process exploits the occupancy map information in order to detect the non-empty pixels in the geometry/texture images/layers. The 3D positions of the points associated with those pixels are computed by levering the auxiliary patch information and the geometry images. More precisely, let P be the point associated with the pixel (u, v) and let (δ0, s0, r0) be the 3D location of the patch to which it belongs and (u0, v0, u1, v1) its 2D bounding box. P could be expressed in terms of depth δ(u, v), tangential shift s(u, v) and bi-tangential shift r(u, v) as follows:

$$\delta(u,v)=\delta 0+g(u,v)$$

$$s(u,v)=s0-u0+u$$

$$r(u,v)=r0-v0+v$$

where g(u, v) is the luma component of the geometry image.

Attribute smoothing procedure 109 aims at alleviating potential discontinuities that may arise at the patch boundaries due to compression artifacts. The implemented approach moves boundary points to the centroid of their nearest neighbors.

A multiplexer 112 may receive a compressed geometry video and a compressed texture video from the video compression 108, and optionally a compressed auxiliary patch information from auxiliary patch-info compression 111. The multiplexer 112 uses the received data to produce a compressed bitstream.

Figure 3:
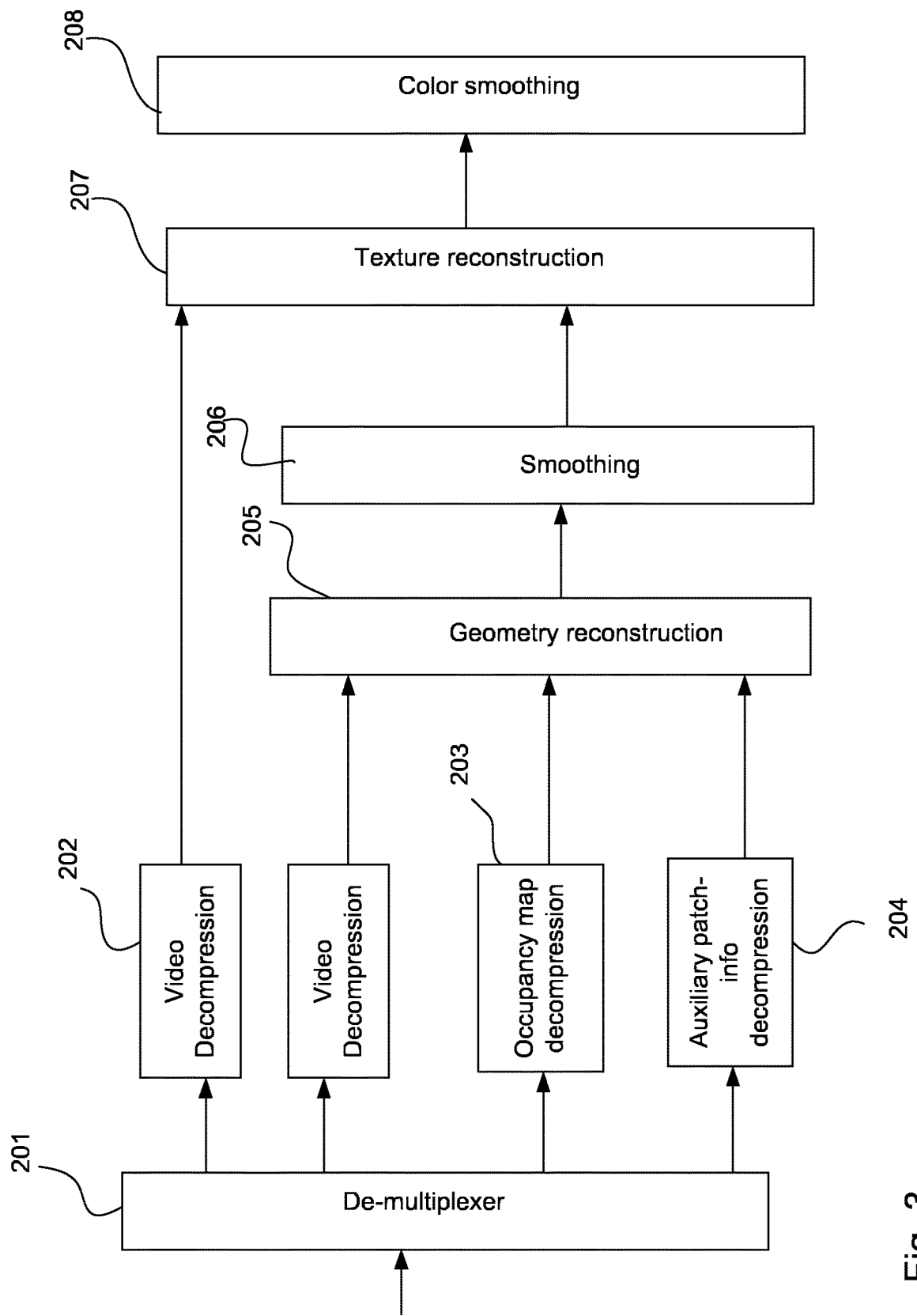
FIG. 3 shows an example of decompression process.

FIG. 3 illustrates an overview of a de-compression process for MPEG Point Cloud Coding (PCC). A de-multiplexer 201 receives a compressed bitstream, and after de-multiplexing, provides compressed texture video and compressed geometry video to video decompression 202. In addition, the de-multiplexer 201 transmits compressed occupancy map to occupancy map decompression 203. It may also transmit a compressed auxiliary patch information to auxiliary patch-info compression 204. Decompressed geometry video from the video decompression 202 is delivered to geometry reconstruction 205, as are the decompressed occupancy map and decompressed auxiliary patch information. The point cloud geometry reconstruction 205 process exploits the occupancy map information in order to detect the non-empty pixels in the geometry/texture images/layers. The 3D positions of the points associated with those pixels may be computed by leveraging the auxiliary patch information and the geometry images.

The reconstructed geometry image may be provided for smoothing 206, which aims at alleviating potential discontinuities that may arise at the patch boundaries due to compression artifacts. The implemented approach moves boundary points to the centroid of their nearest neighbors. The smoothed geometry may be transmitted to texture reconstruction 207, which also receives a decompressed texture video from video decompression 202. The texture values for the texture reconstruction are directly read from the texture images. The texture reconstruction 207 outputs a reconstructed point cloud for color smoothing 208, which further provides the reconstructed point cloud.

Coding of occupancy information can be performed with the geometry image. A specific depth value, e.g. 0, or a specific depth value range may be reserved to indicate that a pixel is inpainted and not present in the source material. The specific depth value or the specific depth value range may be pre-defined, for example in a standard, or the specific depth value or the specific depth value range may be encoded into or along the bitstream and/or may be decoded from or along the bitstream. This way of multiplexing the occupancy information in the depth sample array creates sharp edges into the images, which may be subject to additional bitrate as well as compression artefacts around the sharp edges.

One way to compress a time-varying volumetric scene/object is to project 3D surfaces on to some number of pre-defined 2D planes. Regular 2D video compression algorithms can then be used to compress various aspects of the projected surfaces. For example, a time-varying 3D point cloud with spatial and texture coordinates, can be mapped into a sequence of at least two sets of planes, where one of the two sets carry the texture data and the other carries the distance of the mapped 3D surface points from the projection planes.

For accurate 2D to 3D reconstruction at the receiving side, the decoder must be aware which 2D points are "valid" and which points stem from interpolating/padding. This requires the transmission of additional data. The additional data may be encapsulated in the geometry image as a pre-defined depth value (e.g. 0) or a pre-defined range of depth values. This will increase the coding efficiency only on the texture image, since the geometry image is not blurred/padded. Furthermore, encoding artefacts at the object boundaries of the geometry image may create severe artefacts, which require post-processing and may not be concealable.

A simple V-PCC decoder implementation is currently configured to render all the decoded and reconstructed data as points However, currently mobile devices have not been designed to render millions of points. Since games and similar applications use triangles as rendering primitives, such points as rendering primitives are not optimize for mobile graphical processing units (GPU). Quality of the rendering dense point clouds may also suffer from visual artefacts as points may overlap with the neighboring points. This may lead to unpleasant visual quality when point cloud content is seen from close distance. Optimally each point could be rendered with a cube that would lead to better visual quality. However, in such case each cube would consist of 12 triangles. It is realized that this is 6 times more complex than rendering points with 2 triangles (quad) and therefore not practical in any means on battery limited mobile devices.

The present embodiments are targeted to rendering performance and visual quality of the point clouds by introducing fast and high-quality rendering pipeline. The present embodiments provide a method for encoding and a method for rendering with corresponding apparatuses In the method for encoding, according to an embodiment, a volumetric video frame is received as input, wherein the volumetric video frame is represented as a set of 3D samples. The patch generation process (FIG. 1; 102) converts each 3D sample into several 2D samples relating to different projections. In the patch packing (FIG. 1; 103), a geometry and texture images (FIG. 1; 104, 105) are generated based on the generated patches. Each patch is further projected onto two images, i.e. two layers, wherein the first layer is called as "near layer", or depth 0 layer, and the second layer is called as "far layer", or depth 1 layer. The first layer stores lowest depth values of the set of points of the patch, and the second layer stores highest depth values of the set of points of the patch. Thus, the frame is decomposed into far and near components for geometry and corresponding attributes components. In addition, an occupancy map (FIG. 1; 106) is created to indicate occupied and non-occupied parts of the frame.

The encoder determines a surface parameter for each patch. For example, the surface parameter can be a "rendering_thickness" parameter, which is calculated by the encoder from patch depth differences. The encoder encodes depth frames and decodes them to find out the decoded depth values used by the decoder. The encoder uses original maximum depth value from depth 0 and depth 1 layer, and subtracts decoded depth minimum value from the depth 0 and depth 1 layers. This value is the maximum depth difference between the original and decoded depth values, and the rendering thickness parameter is the maximum difference values for all the pixels for given patch. Encoder can detect if there is a lot of variance between the thickness values for all the pixels for given patch. Encoder can detect if there is a lot of variance between the thickness values and can split patches into smaller ones for patches that have high variance.

The pre-calculated surface parameters, such as the aforementioned rendering thickness, are stored in the encoded bitstream. The parameter may be signaled by a rendering thickness parameter, which is provided for each patch, for each layer or for a single layer.

The rendering thickness parameter (8 bits) may be signaled in the encoded bitstream, or with additional SEI message. Instead, the rendering thickness parameters may be signaled per block (e.g. 16×16) level, which gives more accurate thickness parameter. The rendering thickness parameter may also be stored in occupancy map, instead of signaling in a SEI message. Occupancy map value 0 means pixel is not occupied, and any other value is directly rendering thickness value. Alternatively, 0 means not occupied, 1 means fill values between depth 0 and depth 1, and the value 2 or over gives the actual rendering thickness. This will optimize small rendering thickness values and give better compression. Encoder can also filter neighboring thickness values. For example if thickness values are 3, 2, 3, 3 the encoder can decide to put all the values to 3.

It is also possible that some of the patches may use per pixel rendering thickness values and other patches may use per patch values. There can be additional 1-bit signal per patch to user per patch values or per pixel occupancy map values. Yet as a further alternative, the rendering thickness can be signaled separately for each layer or just for single layer.

According to another embodiment, color interpolation between the layers can be signaled also, or instead, in a bitstream. Mode 0 does not interpolate colors between layers 0 and 1 but the mode 1 can interpolate colors between the layers.

According to another embodiment, difference between the original depth0 and decoded depth0 is calculated and the difference (delta) is encoded to occupancy map. This allows lossless depth0 coordinates as encoded depth0 values are lossy and delta values encoded to occupancy map are lossless.

The method for rendering of the point cloud can comprise the following steps:

The method starts by receiving a bitstream, which has been encoded according to previous embodiments. The bitstream comprises at least a geometry image and a texture image. The method comprises decoding from the bitstream corresponding patches. FIG. 4 illustrates an example of a frame 410 comprising a patch 420. The decoded patches 420 are split into blocks 425 having e.g. a size of 16×16 pixels. For each block 425, a depth minimum and a depth maximum are determined. According to an first alternative, the depth minimum and the depth maximum are calculated from the pixels of depth layer 0 and depth layer 1 in real-time. According to a second alternative, the depth minimum and the depth maximum values can be decoded from patch metadata where they have been stored by the encoder.

The determined depth minimum and depth maximum values will be used to form a 3D bounding box (AABB) (also referred to as "first bounding box") for the blocks, i.e. for the entire block of pixels, wherein the content of the patch is projected. Optionally, in this phase, the formed bounding box can be checked against viewing frustum and can be culled away if not visible. In a case where point cloud data formed by the block of pixels is visible, the block may be drawn to the framebuffer as three-dimensional cube (12 triangles). FIG. 5 illustrates a frame 510, comprising a block 525 in 3D, wherein the block 525 comprises a rendered pixel 530.

In the second phase, each pixel 530 of the 3D block 525 is rendered to the framebuffer. For each pixel 530, a direction of a ray may be calculated from a viewpoint of a user to the coordinates of the pixel in 3D. The viewpoint may be detected by a head-orientation detector of a viewing device. Based on the ray, "point of entry" and "point of exit" are determined according to the intersection of the ray to the generated three-dimensional bounding box (AABB) of the block.

Figure 6:
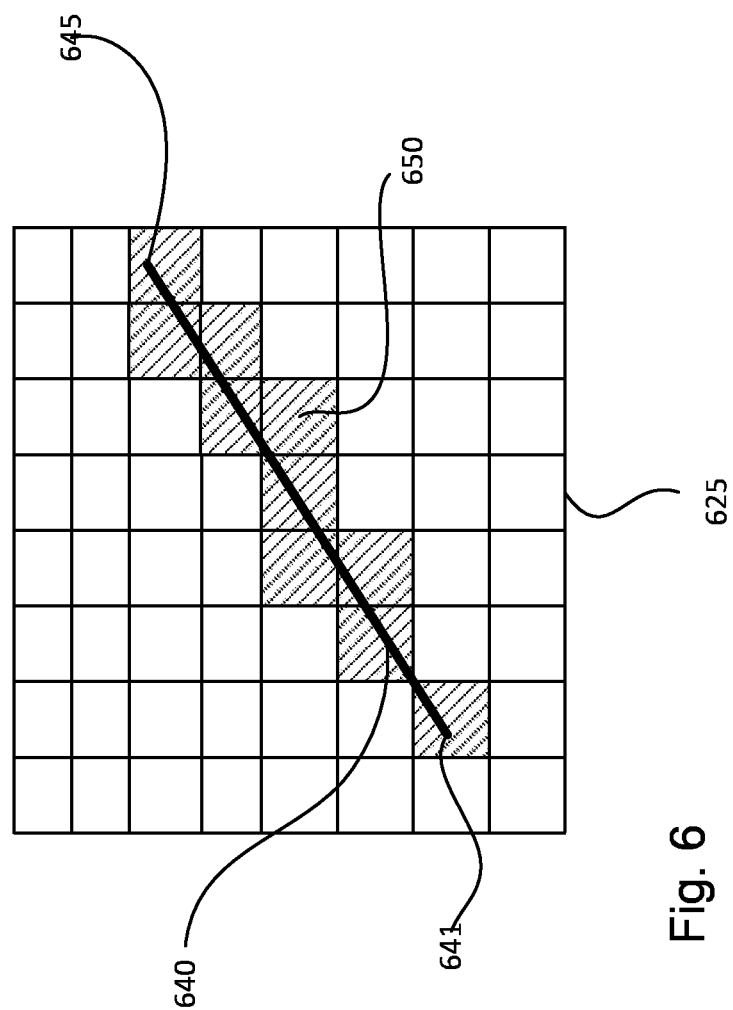
FIG. 6 shows an example of a block in 2D.

FIG. 6 illustrates a block 625 of a patch in 2D. In the block 625, the ray is indicated with 640. In FIG. 6, the point of enter is indicated with 641 and the point of exit is indicated with 645. These two points 641, 645 will determine in which 3D coordinate the ray will enter the bounding box (AABB) and the point in which 3D coordinate the ray exits the bounding box (AABB). These two points 641, 645 correspond to 2D coordinates in the block 625. Between these 2D coordinates, ray casting is done so that every pixel 650 intersected by the ray between the "point of entry" 641 and "point of exit" 645 is visited in the order starting from "point of entry" 641. These pixels are shown with pattern filling as indicated with 650. In ray casting (also known as a "ray marching" or "ray tracing"), each pixel between the point of entry 641 and point of exit 645 are evaluated to obtain a depth value.

The ray casting is continued from pixel to pixel along the viewing ray until an intersection of the ray to the point cloud or the "point of exit" is reached. To determine the intersection, depth values for both depth layer 0 and depth layer 1 are fetched for each 2D block pixel. For each step of ray casting, also depth value from the ray is calculated. Now, if depth value from the ray is in between depth layer 0 and depth layer 1, it is determined as an intersection between point cloud content and the ray This intersection can be also more accurately calculated by forming another bounding box (AABB) (also referred to as "second bounding box") from depth difference values (depth0−depth1) and the 2D coordinates of the pixel being processed. The second bounding box is for the span of point locations represented by a single pixel. The size of the second bounding box may be 1×1×(depth1−depth0+thickness), i.e. the size of a single pixel with the depth of the surface that has been projected into that one pixel. Depths difference can be enlarged by the rendering surface thickness parameter.

If the intersection is not determined, the process is continued with a next 2D pixel.

After having reached the intersection, the intersection depth value will be compared by the GPU with the depth value written in the depth buffer. In a case where intersection is closed to the viewer, new depth value is written to the depth buffer and new calculated color value will be written. The color value of the texture layer 0 or texture layer 1 (depending which layer is closest to the intersection) is thus fetched. Alternatively, interpolated color between the texture layer 0 and texture layer 1 can be used.

Figure 7:
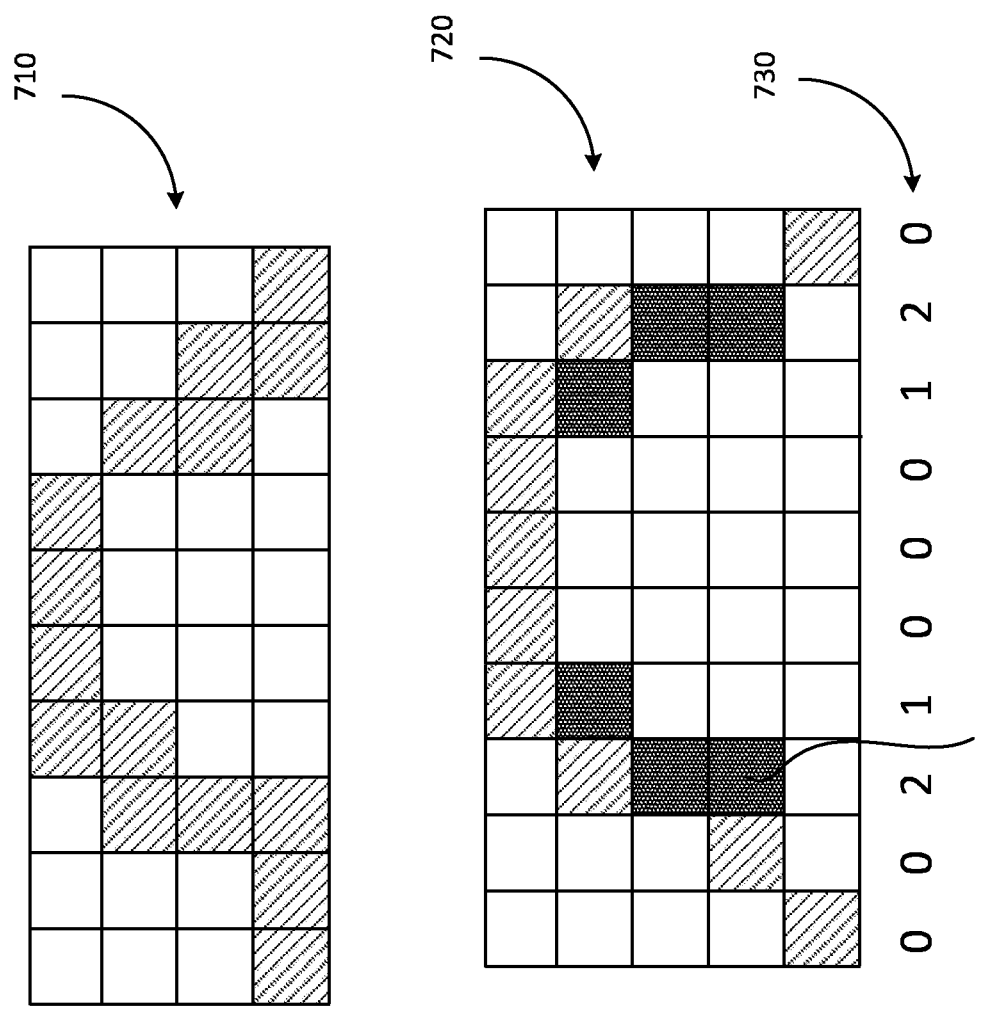
FIG. 7 shows an example of a decoded signal with potential rendering surface thickness values.

Due to the depth compression artefacts, depth 0 and depth 1 values can be changed so that holes can be created if lossy compression used. This can be detected in the encoder, and the surface thickness value can be increased in those regions to effectively fill the holes when the model is finally rendered. FIG. 7 illustrates simple one depth layer case where depth values are changed by the compression. FIG. 7 illustrates an original surface 710 and decoded single layer 720. These holes evaluated by the encoder and the new surface rendering thickness value is calculated per depth pixel so that more surface thickness is added in order to fix the holes. FIG. 7 illustrated decoded signal with potential rendering surface thickness values calculated to (0, 0, 2, 1, 0, 0, 0, 1, 2, 0) 730. Reconstruction of the point cloud with the rendering surface thickness parameter allows to extend the surface so that new points are created to make the surface thicker. New points generated by the rendering surface thickness parameter is shown with dark pixels 725. There are various ways of signaling the rendering surface thickness parameter ranging from per pixel values to per patch values. It is to be noticed that if point reconstruction is used, there is a need to generate new points based on the rendering thickness parameter. However, this is not the case if the previously described raytracing process is used, as the bounding box (AABB) size can be adjusted by the rendering surface thickness. Therefore, there is no additional performance cost of adjusting the box size as there was, if more points were constructed.

In lossless and lossy encoded frames, there can be additional special patches (PCM, missed points patched) that just contain XYZ coordinates. It is not possible to ray cast these kinds of patches as points are in random positions. However, it is possible to render these special patches by rendering each point with a cube as the count of the missed points is low. This will lead to same quality as those points were raytraced (single cube per point).

Figure 8:
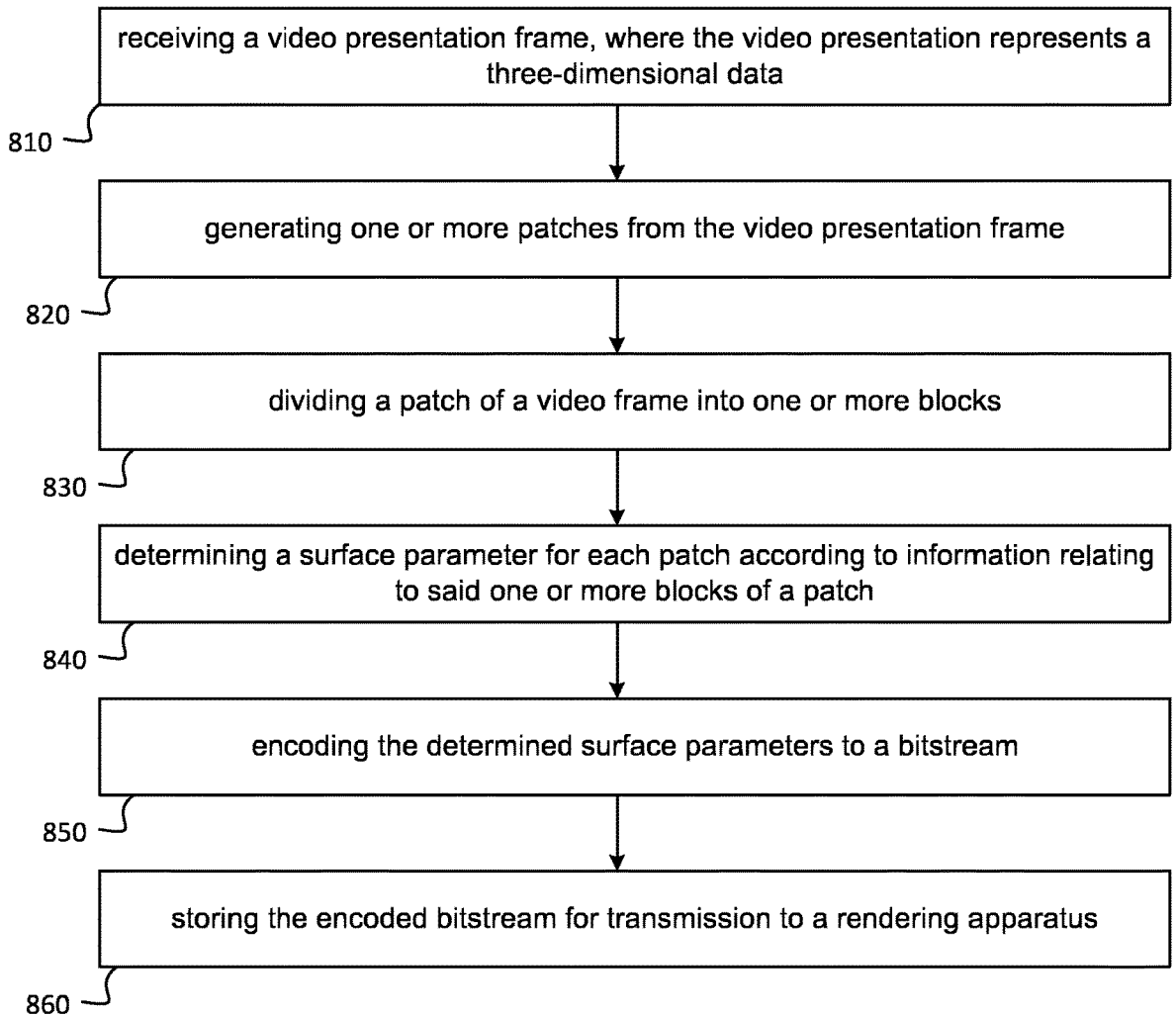
FIG. 8 is a flowchart illustrating a method according to an embodiment.

FIG. 8 is a flowchart illustrating a method for encoding according to an embodiment. A method comprises receiving 810 a video presentation frame, where the video presentation represents a three-dimensional data; generating 820 one or more patches from the video presentation frame; dividing 830 a patch of a video frame into one or more blocks; determining 840 a surface parameter for each patch according to information relating to said one or more blocks of a patch; encoding 850 the determined surface parameters to a bitstream; and storing 860 the encoded bitstream for transmission to a rendering apparatus.

Figure 9:
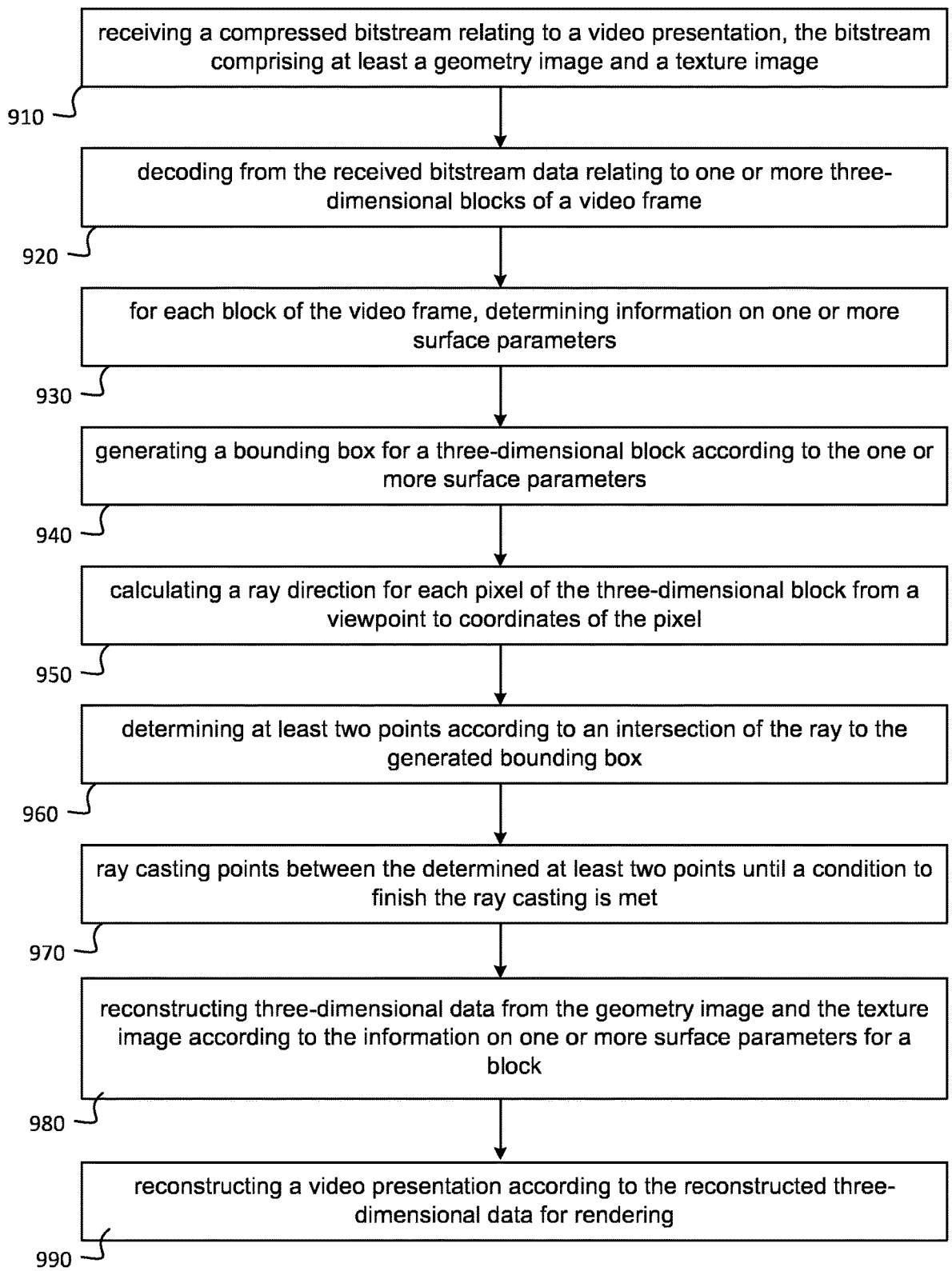
FIG. 9 is a flowchart illustrating a method according to another embodiment.

FIG. 9 is a flowchart illustrating a method for decoding according to another embodiment. A method comprises receiving 910 a compressed bitstream relating to a video presentation, the bitstream comprising at least a geometry image and a texture image; decoding 920 from the received bitstream data relating to one or more three-dimensional blocks of a video frame; for each block of the video frame, determining 930 information on one or more surface parameters; generating 940 a bounding box for a three-dimensional block according to the one or more surface parameters; calculating 950 a ray direction for each pixel of the three-dimensional block from a viewpoint to coordinates of the pixel; determining 960 at least two points according to an intersection of the ray to the generated bounding box; ray casting 970 points between the determined at least two points until a condition to finish the ray casting is met; reconstructing 980 three-dimensional data from the geometry image and the texture image according to the information on one or more surface parameters for a block; reconstructing 990 a video presentation according to the reconstructed three-dimensional data for rendering.

The three-dimensional data in the above examples can be a point cloud.

An apparatus according to an embodiment comprises at least means for receiving a video presentation frame, where the video presentation represents a three-dimensional data; means for generating one or more patches from the video presentation frame; means for dividing a patch of a video frame into one or more blocks; means for determining a surface parameter for each patch according to information relating to said one or more blocks of a patch; means for encoding the determined surface parameters to a bitstream; and means for storing the encoded bitstream for transmission to a rendering apparatus.

The means comprises at least one processor, and a memory including a computer program code, wherein the processor may further comprise processor circuitry. The memory and the computer program code are configured to, with the at least one processor, cause the apparatus to perform the method of flowchart in FIG. 8 according to various embodiments.

An apparatus according to another embodiment comprises at least means for receiving a compressed bitstream relating to a video presentation, the bitstream comprising at least a geometry image and a texture image; means for decoding from the received bitstream data relating to one or more three-dimensional blocks of a video frame; for each block of the video frame, means for determining information on one or more surface parameters; means for generating a bounding box for a three-dimensional block according to the one or more surface parameters; means for calculating a ray direction for each pixel of the three-dimensional block from a viewpoint to coordinates of the pixel; means for determining at least two points according to an intersection of the ray to the generated bounding box; means for ray casting points between the determined at least two points until a condition to finish the ray casting is met; means for reconstructing three-dimensional data from the geometry image and the texture image according to the information on one or more surface parameters for a block; and means for reconstructing a video presentation according to the reconstructed three-dimensional data for rendering.

The means comprises at least one processor, and a memory including a computer program code, wherein the processor may further comprise processor circuitry. The memory and the computer program code are configured to, with the at least one processor, cause the apparatus to perform the method of flowchart in FIG. 9 according to various embodiments.

The three-dimensional data in the above examples can be a point cloud.

Figure 10:
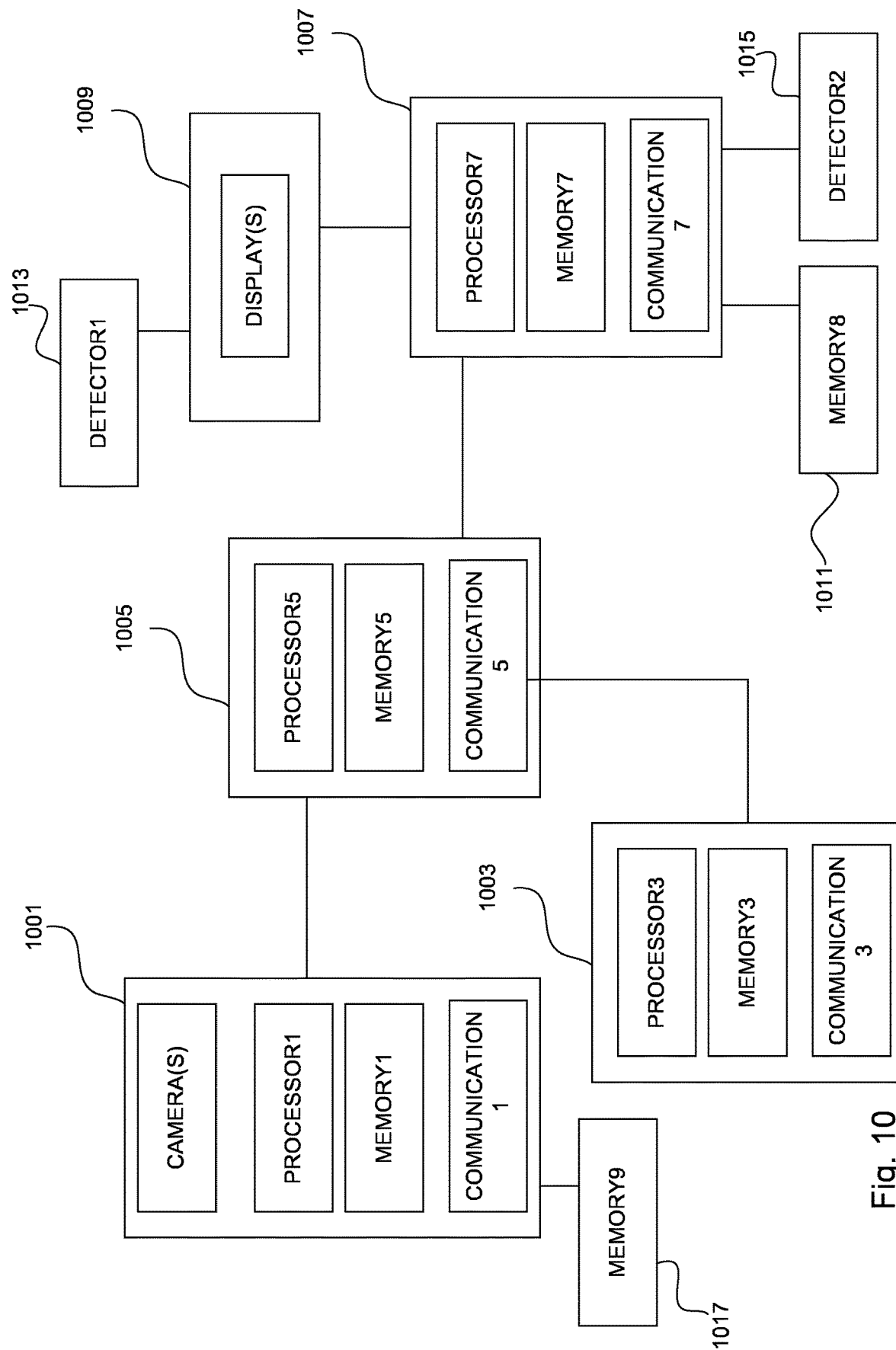
FIG. 10 shows a system according to an embodiment.

FIG. 10 shows a system and apparatuses for viewing volumetric video according to present embodiments. The task of the system is that of capturing sufficient visual and auditory information from a specific location such that a convincing reproduction of the experience, or presence, of being in that location can be achieved by one or more viewers physically located in different locations and optionally at a time later in the future. Such reproduction requires more information that can be captured by a single camera or microphone, in order that a viewer can determine the distance and location of objects within the scene using their eyes and their ears. To create a pair of image with disparity, two camera sources are used. In a similar manner, for the human auditory system to be able to sense the direction of sound, at least two microphones are used (the commonly known stereo sound is created by recording two audio channels). The human auditory system can detect the cues, e.g. in timing difference of the audio signals to detect the direction of sound.

The system of FIG. 10 may comprise three parts: image sources 1001, 1003, a server 1005 and a rendering device 1007. An image source can be a video capture device 1001 comprising two or more cameras with overlapping field of view so that regions of the view around the video capture device is captured from at least two cameras. The video capture device 1001 may comprise multiple microphones (not shown in the figure) to capture the timing and phase differences of audio originating from different directions. The video capture device 1001 may comprise a high-resolution orientation sensor so that the orientation (direction of view) of the plurality of cameras can be detected and recorded The video capture device 1001 comprises or is functionally connected to a computer processor PROCESSOR1 and memory MEMORY1, the memory comprising computer program code for controlling the video capture device 1001. The image stream captured by the video capture device 1001 may be stored on a memory MEMORY1 and/or removable memory MEMORY9 for use in another device, e.g. in a viewer, and/or transmitted to a server 1005 using a communication interface COMMUNICATION1.

Alternatively, or in addition to the video capture device 1001 creating an image stream, or a plurality of such, one or more image source devices 1003 of synthetic images may be present in the system. Such image source devices 1003 of synthetic images may use a computer model of a virtual world to compute the various image streams it transmits. For example, the image source 703 may compute N video streams corresponding to N virtual cameras located at a virtual viewing position. When such a synthetic set of video streams is used for viewing, the viewer may see a three-dimensional virtual world. The image source device 1003 comprises or is functionally connected to a computer processor PROCESSOR3 and memory MEMORY3, the memory comprising computer program code for controlling the image source device 1003. There may be a storage, processing and data stream serving network in addition to the video capture device 1001. For example, there may be a server 1005 or a plurality of servers storing the output from the video capture device 1001 or image source device 1003. The server 705 comprises or is functionally connected to a computer processor PROCESSOR5 and memory MEMORY5, the memory comprising computer program code for controlling the server 1005. The server 1005 may be connected by a wired or wireless network connection, or both, to sources 1001 and/or 1003, as well as the viewer devices 1009 over the communication interface COMMUNICATION5.

For viewing the captured or created video content, there may be one or more viewer devices 1009 (a.k.a. playback devices). These viewer devices 1009 may have one or more displays, and may comprise or be functionally connected to a rendering module 1007. The rendering module 1007 comprises a computer processor PROCESSOR7 and memory MEMORY7, the memory comprising computer program code for controlling the viewer devices 1009. The viewer devices 1009 may comprise a data stream receiver for receiving a video data stream from a server and for decoding the video data stream. The data stream may be received over a network connection through communications interface, or from a memory device 1011 like a memory card. The viewer devices 1009 may have a graphics processing unit for processing of the data to a suitable format for viewing. The viewer device 709 can be a high-resolution stereo-image head-mounted display for viewing the rendered stereo video sequence. The head-mounted display may have an orientation detector 1013 and stereo audio headphones. According to an embodiment, the viewer device 1009 is a display enabled with 3D technology (for displaying stereo video), and the rendering device 1007 may have a head-orientation detector 10 15 connected to it. Alternatively, the viewer device 1009 may comprise a 2D display, since the volumetric video rendering can be done in 2D by rendering the viewpoint from a single eye instead of a stereo eye pair. Any of the devices 1001, 1003, 1005, 1007, 1009 may be a computer or a portable computing device, or be connected to such. Such devices may have computer program code for carrying out methods according to various examples described in this text.

As mentioned, the viewer device can be a head-mounted display (HMD). The head-mounted display comprises two screen sections or two screens for displaying the left and right eye images. The displays are close to the eyes, and therefore lenses are used to make the images easily viewable and for spreading the images to cover as much as possible of the eyes' field of view. The device is attached to the head of the user so that it stays in place even when the user turns his head. The device may have an orientation detecting module for determining the head movements and direction of the head. The head-mounted display gives a three-dimensional (3D) perception of the recorded/streamed content to a user.

Figure 11:
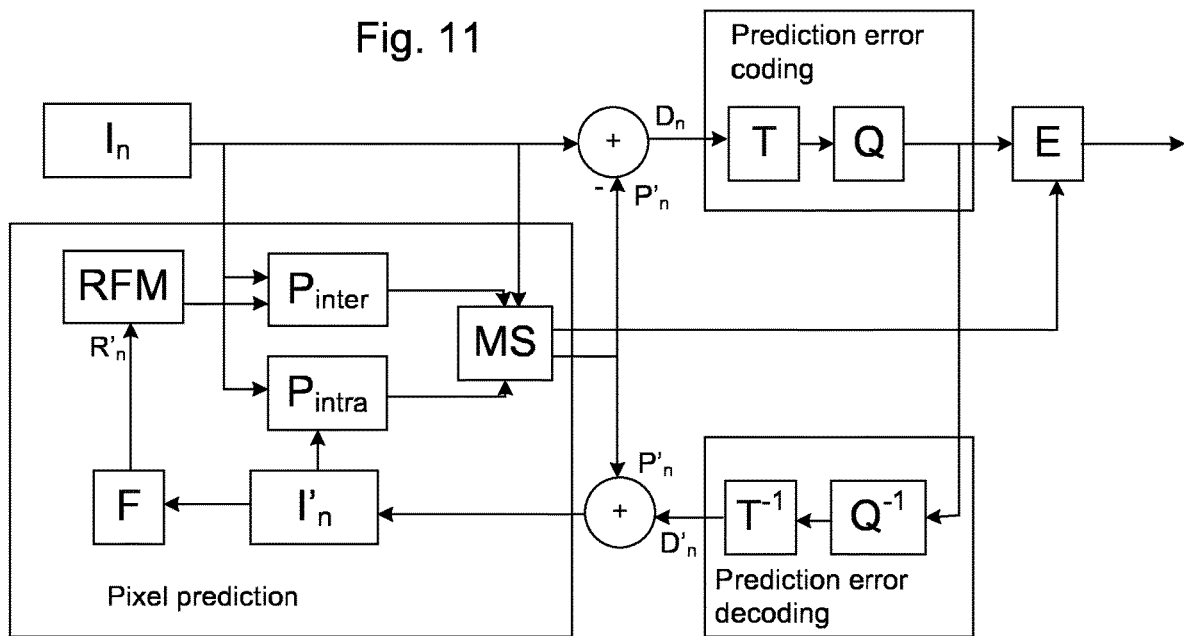
FIG. 11 shows an encoding process according to an embodiment.
Figure 12:
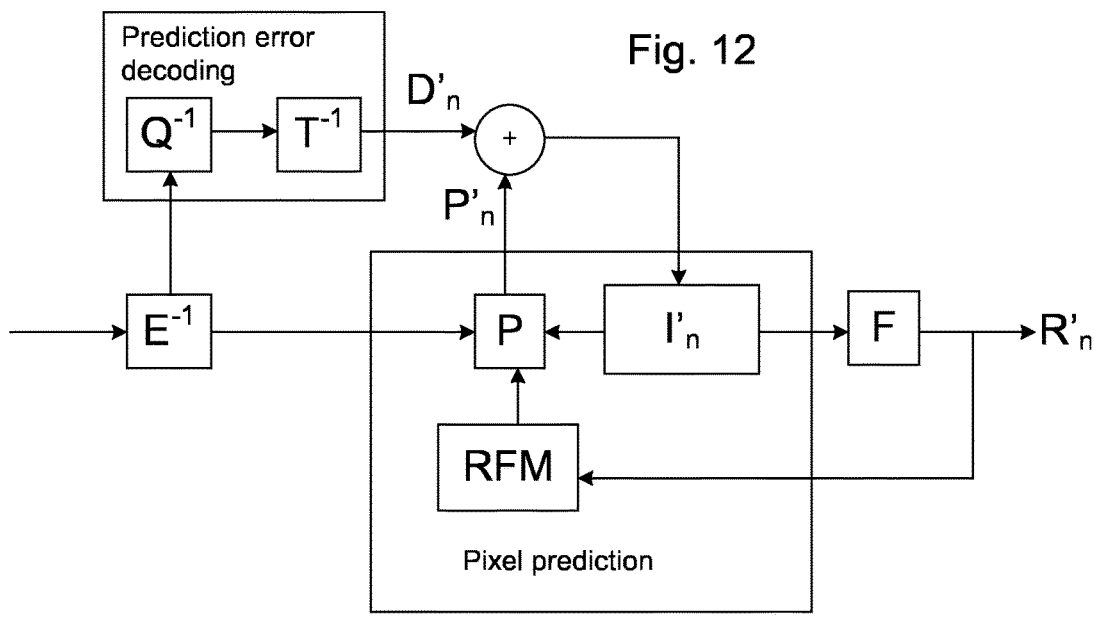
FIG. 12 shows an decoding process according to an embodiment.

The video material captured or generated by any of the image sources can be provided for an encoder that transforms an input video into a compressed representation suited for storage/transmission. The compressed video is provided for a decoder that can uncompress the compressed video representation back into a viewable form. The encoder may be located in the image sources or in the server. The decoder may be located in the server or in the viewer, such as a HMD. The encoder may discard some information in the original video sequence in order to represent the video in a more compact form (that is, at lower bitrate). An example of an encoding process is illustrated in FIG. 11. FIG. 11 illustrates an image to be encoded (I″); a predicted representation of an image block (P'''); a prediction error signal (D''); a reconstructed prediction error signal (D'''); a preliminary reconstructed image (I'''); a final reconstructed image (R'''); a transform (T) and inverse transform (T$^{-1}$); a quantization (Q) and inverse quantization (Q$^{-1}$); entropy encoding (E); a reference frame memory (RFM); inter prediction (P$^{inter}$); intra prediction (P$^{intra}$); mode selection (MS) and filtering (F). An example of a decoding process is illustrated in FIG. 12. FIG. 12 illustrates a predicted representation of an image block (P'''); a reconstructed prediction error signal (D'''); a preliminary reconstructed image (I'''); a final reconstructed image (R'''); an inverse transform (T$^{-1}$); an inverse quantization (Q$^{-1}$); an entropy decoding (E$^{-1}$); a reference frame memory (RFM); a prediction (either inter or intra) (P); and filtering (F).

The various embodiments may provide advantages. For example, the present embodiments provide superior visual quality compared to point rendering and automatic hole filling with zero cost. In addition, either energy saved, or more complex points clouds can be rendered as the rendering is faster than point rendering. In addition, the various embodiments provide flexible thickness signaling per patch or per pixel.

The various embodiments can be implemented with the help of computer program code that resides in a memory and causes the relevant apparatuses to carry out the method. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment. The computer program code comprises one or more operational characteristics. Said operational characteristics are being defined through configuration by said computer based on the type of said processor, wherein a system is connectable to said processor by a bus, wherein a programmable operational characteristic of the system according to an embodiment comprises at least the steps as defined by a flowchart of FIG. 8 or FIG. 9.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. A method for encoding, comprising:
receiving a video presentation frame, wherein the video presentation represents a three-dimensional data;
generating one or more patches from the video presentation frame;
dividing a patch of a video frame into one or more blocks;
determining a surface parameter for each patch according to information relating to said one or more blocks of the patch;
encoding the determined surface parameters to a bitstream; and
encoding a thickness parameter into a supplemental enhancement information message.

2. A method for decoding, comprising:
receiving a compressed bitstream relating to a video presentation, the compressed bitstream comprising at least a geometry image and a texture image;
decoding from the compressed bitstream data relating to one or more three-dimensional blocks of a video frame;
determining information on one or more surface parameters for blocks of the video frame;
generating a bounding box for a three-dimensional block according to the one or more surface parameters;
calculating a ray direction for pixels of the three-dimensional block from a viewpoint to coordinates of the pixel;
determining at least two points according to an intersection of the ray to the generated bounding box;
ray casting points between the determined at least two points until a condition to finish the ray casting is met;
wherein the condition to finish the ray casting is determined by determining depth values for both depth layers on location of a pixel, by calculating a depth value from the viewing ray, and by comparing the depth value from the viewing ray to the determined depth values;
reconstructing three-dimensional data from the geometry image and the texture image according to the information on the one or more surface parameters for a block; and
reconstructing a video presentation according to the reconstructed three-dimensional data for rendering.

3. An apparatus comprising:
at least one processor; and
at least one memory storing instructions that, when executed by the at least one processor, cause the apparatus at least to:
receive a video presentation frame, wherein the video presentation represents a three- dimensional data;
generate one or more patches from the video presentation frame;
divide a patch of a video frame into one or more blocks;
determine a surface parameter for each patch according to information relating to said one or more blocks of the patch;
encode the determined surface parameters to a bitstream; and
encode a thickness parameter into a supplemental enhancement information message.

4. The apparatus according to claim 3, wherein the surface parameter is a depth or a depth difference of a patch.

5. The apparatus according to claim 3, wherein the surface parameter is a thickness parameter determined from a depth difference.

6. The apparatus according to claim 3, wherein a thickness parameter is determined for each block.

7. The apparatus according to claim 3, wherein a thickness parameter is encoded to an occupancy map.

8. The apparatus according to claim 3, wherein the apparatus is further caused to perform: encode a color interpolation between depth layers to the bitstream.

9. An apparatus comprising:
at least one processor; and
at least one memory storing instructions that, when executed by the at least one processor, cause the apparatus at least to:
receive a compressed bitstream relating to a video presentation, the compressed bitstream comprising at least a geometry image and a texture image;
decode from the compressed bitstream data relating to one or more three-dimensional blocks of a video frame;
determine information on one or more surface parameters for blocks of the video frame;
wherein the information on one or more surface parameters is determined from pixels of various depth layers;
generate a bounding box for a three-dimensional block according to the one or more surface parameters;
calculate a ray direction for pixels of the three-dimensional block from a viewpoint to coordinates of the pixel;
determine at least two points according to an intersection of the ray to the generated bounding box;
ray cast points between the determined at least two points until a condition to finish the ray casting is met;
reconstruct three-dimensional data from the geometry image and the texture image according to the information on the one or more surface parameters for a block; and
reconstruct a video presentation according to the reconstructed three-dimensional data for rendering.

10. The apparatus according to claim 9, wherein the information on one or more surface parameters is decoded from the compressed bitstream.

11. The apparatus according to claim 9, wherein the condition to finish the ray casting is determined by determining depth values for both depth layers on location of a pixel, by calculating a depth value from the viewing ray, and by comparing the depth value from the viewing ray to the determined depth values.

12. The apparatus according to claim 9, wherein the condition to finish the ray casting is determined from another bounding box that is formed from depth difference values and pixel coordinates.

13. The apparatus according to claim 9, wherein the surface parameter is a depth or a depth difference of a patch.

14. The apparatus according to claim 9, wherein the surface parameter is a thickness parameter determined from a depth difference.

15. The apparatus according to claim 9, wherein the apparatus is further caused to perform: determine at least two points based on the ray direction and ray casting every pixel between said two points in two-dimensional coordinates.

16. The apparatus according to claim 15, wherein the apparatus is further caused to perform: obtain depth values for first and second depth layers for each two-dimensional pixels between said two points.

17. The apparatus according to claim 16, wherein the apparatus is further caused to perform: determine whether there is an intersection between point cloud content and the ray.

18. The apparatus according to claim 9, wherein the apparatus is further caused to perform: decode a thickness parameter from a supplemental enhancement information (SEI) message.

19. An apparatus comprising:
at least one processor; and
at least one memory storing instructions that, when executed by with the at least one processor, cause the apparatus at least to:
receive a compressed bitstream relating to a video presentation, the compressed bitstream comprising at least a geometry image and a texture image;
decode from the compressed bitstream data relating to one or more three-dimensional blocks of a video frame;
determine information on one or more surface parameters for blocks of the video frame;
generate a bounding box for a three-dimensional block according to the one or more surface parameters;
calculate a ray direction for pixels of the three-dimensional block from a viewpoint to coordinates of the pixel;
determine at least two points according to an intersection of the ray to the generated bounding box;
ray cast points between the determined at least two points until a condition to finish the ray casting is met;
wherein the condition to finish the ray casting is determined from another bounding box that is formed from depth difference values and pixel coordinates;
reconstruct three-dimensional data from the geometry image and the texture image according to the information on the one or more surface parameters for a block; and
reconstruct a video presentation according to the reconstructed three-dimensional data for rendering.

20. An apparatus comprising:
at least one processor; and
at least one memory storing instructions that, when executed by with the at least one processor, cause the apparatus at least to:
receive a compressed bitstream relating to a video presentation, the compressed bitstream comprising at least a geometry image and a texture image;
decode from the compressed bitstream data relating to one or more three-dimensional blocks of a video frame;
determine information on one or more surface parameters for blocks of the video frame;
generate a bounding box for a three-dimensional block according to the one or more surface parameters;
calculate a ray direction for pixels of the three-dimensional block from a viewpoint to coordinates of the pixel;
determine at least two points according to an intersection of the ray to the generated bounding box;
ray cast points between the determined at least two points until a condition to finish the ray casting is met;
determine at least two points based on the ray direction and ray casting every pixel between said two points determined based on the ray direction in two-dimensional coordinates;
obtain depth values for first and second depth layers for each two-dimensional pixels between said two points determined based on the ray direction;
reconstruct three-dimensional data from the geometry image and the texture image according to the information on the one or more surface parameters for a block; and
reconstruct a video presentation according to the reconstructed three-dimensional data for rendering.

21. The apparatus of claim 20, wherein the apparatus is further caused to perform: determine whether there is an intersection between point cloud content and the ray.

22. An apparatus comprising:

at least one processor; and at least one memory storing instructions that, when executed by with the at least one processor, cause the apparatus at least to:

receive a compressed bitstream relating to a video presentation, the compressed bitstream comprising at least a geometry image and a texture image;

decode from the compressed bitstream data relating to one or more three-dimensional blocks of a video frame;

determine information on one or more surface parameters for blocks of the video frame;

decode a thickness parameter from a supplemental enhancement information message;

generate a bounding box for a three-dimensional block according to the one or more surface parameters;

calculate a ray direction for pixels of the three-dimensional block from a viewpoint to coordinates of the pixel;

determine at least two points according to an intersection of the ray to the generated bounding box;

ray cast points between the determined at least two points until a condition to finish the ray casting is met;

reconstruct three-dimensional data from the geometry image and the texture image according to the information on the one or more surface parameters for a block; and reconstruct a video presentation according to the reconstructed three-dimensional data for rendering.

* * * * *